US 6,528,567 B1

(12) United States Patent
Arai et al.

(10) Patent No.: US 6,528,567 B1
(45) Date of Patent: Mar. 4, 2003

(54) ANTISTATIC RESIN COMPOSITION

(75) Inventors: Shiro Arai, Fukushima-ken (JP);
Teruhide Watabe, Fukushima-ken (JP)

(73) Assignee: Kureha Kagaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/830,931

(22) PCT Filed: Nov. 2, 1999

(86) PCT No.: PCT/JP99/06100

§ 371 (c)(1),
(2), (4) Date: May 3, 2001

(87) PCT Pub. No.: WO00/27917

PCT Pub. Date: May 18, 2000

(30) Foreign Application Priority Data

Nov. 5, 1998 (JP) .......................................... 10-328815

(51) Int. Cl.⁷ ................................................ C08K 5/36
(52) U.S. Cl. ........................ 524/392; 524/804; 524/819
(58) Field of Search ................................ 524/392, 804, 524/819

(56) References Cited

U.S. PATENT DOCUMENTS

| 4,302,558 A | | 11/1981 | Ohya et al. ................. 525/218 |
| 4,315,081 A | * | 2/1982 | Kobayashi ..................... 525/2 |
| 4,332,919 A | * | 6/1982 | Kobayashi ................... 524/504 |

FOREIGN PATENT DOCUMENTS

| GB | 2070046 | 9/1981 |
| JP | 08-259639 | 10/1996 |

* cited by examiner

*Primary Examiner*—Edward J. Cain
(74) *Attorney, Agent, or Firm*—Wenderoth, Lind & Ponack, L.L.P.

(57) ABSTRACT

An anionic surfactant having a thermal weight loss initiation temperature of at least 250° C. is incorporated with a thermoplastic resin comprising a graft copolymer formed by graft-polymerizing an ethylenically unsaturated monomer onto a rubber trunk polymer obtained by emulsion polymerization using a carboxylic acid-type surfactant. As a result, it is possible to obtain an antistatic resin composition which can be effectively produced on an industrial scale and can provide a shaped product excellent in permanent antistatic property and free from haze or discoloration even when processed under severe processing conditions.

10 Claims, No Drawings

ANTISTATIC RESIN COMPOSITION

This application is a 371 application of PCT/JP99/06100, filed Nov. 2, 1999.

TECHNICAL FIELD

The present invention relates to an improvement in resin composition having permanent antistatic property.

BACKGROUND ART

As plastics generally have a large electrical resistivity and a strong chargeability, static electricity induced thereon by contact, friction, peeling, etc., is difficult to dissipate and thus attracts dust and dirt, thus resulting in troubles, such as impaired appearance on shaped articles, sheets, films and fibers formed from the plastics. For obviating these drawbacks, the following methods, roughly classified, have been investigated.

1. Method of kneading an antistatic agent into. plastics.
2. Method of applying an antistatic agent on the surface of the plastics.
3. Method of surface application of a silicone compound.
4. Method of chemically reforming the structure of plastics.

Among these, the method of kneading an antistatic agent is accompanied with drawbacks such that it is not sufficient for providing permanent antistatic property, so that the antistatic effect is lost if the antistatic agent present on the surface is removed by means of washing with water, rubbing, etc.; that the adhesion of dust and dirt is liable to occur if the antistatic agent excessively bleeds to the surface; and that it impairs the transparence.

The method of surface application of an antistatic agent causes a remarkable lowering in antistatic effect by washing the plastic product.

The method of surface application of a silicone compound can provide a semipermanent antistatic effect but is liable to be economically disadvantageous.

The method of chemically reforming the plastic structure is a method of introducing a hydrophilic group into the plastics as by polymerization or other methods. However, a substantially large amount of hydrophilic group is generally required to be incorporated in order to exhibit antistatic effect, so that the mechanical properties and other properties are adversely affected by moisture absorption.

In contrast to the above, the present applicant already developed a thermoplastic resin composition having permanent antistatic property by incorporating an anionic surfactant into a thermoplastic resin comprising a graft copolymer of a rubber trunk polymer having an alkylene oxide group (Japanese Patent Publication (JP-B) 59-2462; corr. to GB-A 2070046). Herein, "permanent antistatic property" is unlike a non-persistent antistatic property which may be obtained by application of an antistatic agent or bleeding-out to the surface of a shaped article of an antistatic agent kneaded into an ordinary thermoplastic resin and can be remarkably reduced by wiping of the surface, but means a permanently and persistently exhibited antistatic property which is developed by an antistatic agent stably held inside a thermoplastic resin constituting a shaped product and is not essentially reduced by wiping of the shaped product.

While the function mechanism of the above-mentioned thermoplastic resin composition exhibiting permanent anionic surfactant property has not been fully clarified as yet, it is considered that a rubber trunk polymer comprising a monomer having an alkylene oxide group and a conjugated diene or an acrylate ester as one component is dispersed, at the time of processing, in the graft component resin or a mixture of the graft component resin and a thermoplastic resin as the matrix component in the form of mutual bridges, and an antistatic agent added thereto is selectively, adsorbed principally by the rubber trunk polymer, so that when a charging member contacts the shaped body, electric charges of the opposite polarity are moved principally through the rubber trunk polymer phase adsorbing the antistatic agent to be quickly accumulated at the contact surface, thereby dissipating and neutralizing the charges given by the charging member. It is further considered that as the rubber trunk polymer comprises a monomer having an alkylene oxide group, the movement of the charges are extremely promoted to remarkably enhance the addition effect of the antistatic agent.

However, several problems have been found with the above-mentioned antistatic resin composition based on he rubber trunk polymer having an alkylene oxide group, from practical points of view. For example, the above-mentioned resin composition is characterized by an ability of providing a shaped product having good transparence in addition to the antistatic property, but the shaped products were sometimes accompanied with haze or discoloration. Further, in some cases, the shaped products failed to exhibit the expected permanent antistatic property.

Accordingly, an object of the present invention is to provide an antistatic resin composition that can stably retain beautiful appearance and permanent antistatic property.

DISCLOSURE OF INVENTION

According to our study, it has been found possible to achieve the above-mentioned object by adding an improvement in composition to the above-mentioned antistatic resin composition developed by the present applicant from a viewpoint of commercial production process thereof.

More specifically, according to the present invention, there is provided an antistatic resin composition, comprising: (a) 7–100 wt. parts of a graft copolymer formed by graft-polymerizing an ethylenically unsaturated monomer onto a rubber trunk polymer having an alkylene oxide group which has been obtained by using a carboxylic acid-type surfactant as an emulsifier for polymerization, (b) 0–93 wt. parts of a thermoplastic resin, and (c) 0.1–5 wt. parts of an anionic surfactant having a thermal weight loss initiation temperature (as defined by JIS K7120) of at least 250° C.; wherein the rubber trunk polymer occupies 5–80 wt. parts within 100 wt. parts in total of (a) and (b).

Some history and details as to how we have arrived at the present invention as a result of study for achieving the above object, will now be briefly described.

The above-mentioned problems of the haze or discoloration of shaped products found with respect to the antistatic resin composition developed by the present applicant (JP-B 59-2462, corresponding to U.S. Pat. No. 4,315,081) were found in a stage of pursuing an improvement in mass productivity. More specifically, an anionic surfactant used as an antistatic agent in the above-mentioned antistatic resin composition already has a fairly good thermal resistance, but it has been found that such an anionic surfactant is still liable to cause a thermal degradation with respect to a portion thereof subjected to heating for a long residence time in the case of elevating the extruder temperature for injection molding or using a large-capacity extruder, thus causing haze or discoloration of the shaped products in some cases, and thus failing to exhibit an expected level of permanent antistatic property in some cases. Further, it has been also found that the above-mentioned problem is caused accompanying the use of a graft copolymer of a rubber trunk polymer having an alkylene oxide group as a base resin. More specifically, such a graft copolymer is generally recovered in a solid powdery form by subjecting latex after emulsion polymerization to precipitation by salt addition (salting-out) or by acid addition (acid precipitation). The salting-out and the acid precipitation can exhibit substantially equivalent effects for ordinary graft copolymers, such as MBS resin and ABS resin, but the graft copolymer used in the present invention comprises a rubber trunk polymer having an alkylene oxide group functioning as a kind of nonionic surfactant, and a strict control of condition becomes necessary for the salting-out thereof. More specifically, in the case of using a monovalent salt, it is necessary to use a salt solution in an amount and at a concentration which exceed ordinary levels, and this is impractical. For this reason, the salting-out has been performed by using a divalent or higher-valent salt and a solution thereof at a concentration which is still higher than an ordinary level, and the resultant graft copolymer powder is caused to have a fairly high moisture content. This does not pose a substantial problem if a drier, such as a tray drier, allowing long hours of drying, but is liable to cause a difficulty in drying by means of an airborne instantaneous drier or a fluidized bed drier for improving the productivity. Further, the salting-out performed by using a high-concentration solution of a divalent or higher-valent salt is liable to cause the surfactant added in the emulsion polymerization to remain as a divalent or higher-valent metal salt in the resin, which obstructs the adsorption of the anionic surfactant later added as an antistatic agent, thus causing the obstruction of development of permanent antistatic property, as a newly found phenomenon.

In the present invention, the above-mentioned problems accompanying the industrial scale-production of an antistatic resin composition comprising as a base resin a graft copolymer of a rubber trunk polymer having an alkylene oxide group have been successfully solved by (a) selectively using an anionic surfactant having a particularly good heat resistance as an antistatic agent, and (b) using, for recovery of the graft copolymer, not salting-out but acid precipitation which shows better compatibility with the graft copolymer comprising a rubber trunk polymer moiety having an alkylene oxide group, and selectively using a carboxylic acid-type surfactant in the emulsion polymerization of the rubber trunk polymer for effectively performing the acid precipitation.

BEST MODE FOR PRACTICING THE INVENTION

The graft copolymer used as a base resin of the rubber trunk polymer of the present invention is basically similar to the one described in the above-mentioned JP-B 59-2462 except that the rubber trunk polymer thereof has been obtained through polymerization using a carboxylic acid-type surfactant as an emulsifier, and the graft copolymer is recovered by acid precipitation.

More specifically, the rubber trunk polymer preferably used for constituting the graft copolymer of the present invention is a rubbery copolymer comprising: 50–95 wt. % of at least one monomer selected from conjugated dienes and acrylate esters, 5–50 wt. % of at least one monomer having 4–500 alkylene oxide groups and an ethylenically unsaturated bond (hereinafter referred to as a "polyalkylene oxide monomer"), and optionally 0–50 wt. %, preferably 0–40 wt. %, of one or more copolymerizable ethylenically unsaturated monomers.

The rubber trunk polymer may principally comprise at least one monomer selected from conjugated dienes and acrylate esters. The conjugated dienes may includes: 1,3-butadiene, isoprene, chloroprene, 1,3-pentadiene, etc., and the acrylate esters may include: ethyl acrylate, propyl acrylate, butyl acrylate, hexyl acrylate, octyl acrylate, nonyl acrylate, etc.

Unless the conjugated diene and acrylate ester are used in at least 50 wt. % of the rubber trunk polymer, singly or in total, the rubber trunk polymer cannot be provided with a sufficiently low glass-transition temperature, thus resulting in only a small antistatic effect. On the other hand, in excess of 95 wt. %, the addition amount of the polyalkylene oxide monomer is inevitably lowered, so that it becomes impossible to attain the desired antistatic effect.

The polyalkylene oxide monomer has an alkylene oxide chain bonded to an ethylenically unsaturated group and represented by

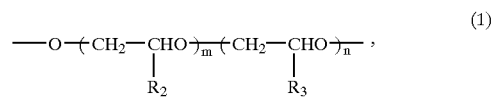

(1)

wherein $R_2$ and $R_3$ independently denote hydrogen or an alkyl group having 1–4 carbon atoms; and m and n are integers satisfying $4 \leq m+n \leq 500$; and is particularly preferably one having an ethylene oxide block including at least 4 ethylene oxide groups obtained with at least one of $R_2$ and $R_3$ being hydrogen.

As the polyalkylene oxide monomer, it is preferred to use at least one species of monomer represented by the following structural formula (2) or (3):

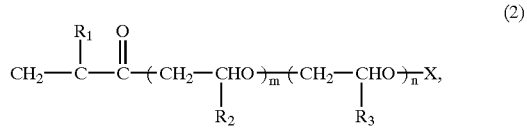

(2)

wherein $R_1$ denotes hydrogen or an alkyl group having 1–4 carbon atoms; X denotes hydrogen, an alkyl group having 1–9 carbon atoms, phenyl group, $SO_3Me$, $SO_2Me$, $PO_3Me_2$,

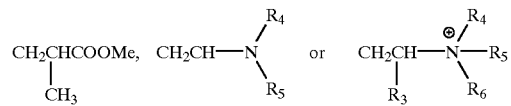

wherein $R_4$, $R_5$ and $R_6$ denote hydrogen or an alkyl group having 1–9 carbon atoms; Me denotes hydrogen or an alkaline metal; and $R_2$, $R_3$, m and n have the same meanings as in the formula (1); or

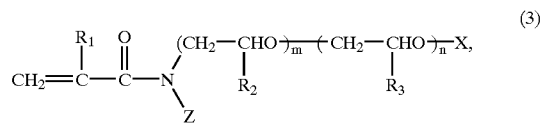

(3)

wherein Z denotes hydrogen, an alkyl group having 1–40 carbon atoms, a cycloalkyl group having 3–6 carbon atoms, phenyl group, or

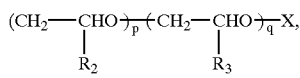

wherein p and q are integers satisfying $4 \leq p+1 \leq 500$, and $R_1$, $R_2$, $R_3$ and X have the same meanings as in formulae (1) and (2).

Among the monomers represented by the above-mentioned formula (2) and formula (3), those including at least one of $R_2$ and $R_3$ being hydrogen and having at least 4 ethylene oxide groups are particularly preferably used. It is of course possible to use similar monomers other than those represented by the formula (2) and formula (3) as far as they have an ethylenically unsaturated bond and a polyalkylene oxide unit and can be copolymerized with a conjugated diene or/and an acrylate ester to provide a rubber trunk polymer with a lower volumetric electrical resistivity.

It is necessary to have 4–500 alkylene oxide groups in the polyalkylene oxide monomer, preferably 6–50 groups, particularly preferably 0–50 groups. Below 4 alkylene oxide groups, it is difficult to impart an antistatic effect, and more than 500 groups, the monomer is not easily soluble and also shows poor polymerizability.

Further, if the polyalkylene oxide monomer is not contained at 5 wt. % or higher in the rubber trunk polymer, it is impossible to provide a sufficient antistatic effect. Further, if not below 50 wt. %, it becomes difficult to effect the polymerization for formation of the rubber trunk polymer or in the graft co-polymerization or the post treatment by acid precipitation of the resultant polymer.

As the ethylenically unsaturated monomer copolymerizable with the conjugated diene or acrylate ester and optionally used for producing the rubber trunk polymer, known monomers may be used. For examples, one or more species of monomers may be used, such as methyl acrylate, alkyl methacrylates, acrylic acid, methacrylic acid, acrylamide, vinyl acetate, unsaturated nitriles, aromatic vinyls, alkyl vinyl ethers, alkyl vinyl ketones, 2-hydroxyethyl (meth) acrylate, diacetone acrylamide, vinyl chloride, vinylidene chloride, itaconic acid, alkyl itaconates, isobutene, 2-acid-pheophoxyethyl methacrylate, 3-chloro-2-acid-phosphoxypropyl methacrylate, and sodium styrenesulfonate. A further enhanced antistatic effect can be attained, if a monomer having a large polarity, such as acrylonitrile, or a monomer having an anionic substituent, such as sulfonic acid group, phosphoric acid group or carboxylic acid group, is used as the above-mentioned ethylenically unsaturated monomer.

Such a copolymerizable ethylenically unsaturated monomer is used within a range of not exceeding 40 wt. % of the rubber trunk polymer. Beyond the range, the rubber trunk polymer is caused to have a high glass transition temperature and lose a rubber characteristic.

For the rubber trunk polymer, it is possible to use a polyfunctional monomer having two or more of at least one species of ethylenically unsaturated groups, such as vinyl group, 1,3-butadienyl group, acryl group, methacryl group and alkyl group, as desired. Particularly, a polyfunctional monomer further having 4–500, preferably 9–50, polyalkylene glycol groups, is preferred since it functions as an antistatic property-imparting agent as well as a crosslinking agent.

As mentioned above, the polymerization for the rubber trunk polymer used in the present invention is performed by emulsion polymerization in the presence of a carboxylic acid-type surfactant. The carboxylic acid-type surfactant effectively functions in acid precipitation with a strong acid, such as hydrochloric acid, described hereinafter, and is also preferred in consideration from environmental aspect compared with other weak acid salt-type surfactants, such as organic phosphoric acid salt-type surfactants inclusive of alkylphosphoric acid salts and alkyl etherphosphoric acid salts. Preferred examples of the carboxylic acid-type surfactant may include: aliphatic acid salts, rosin acid salts, N-acylamino acid salts, alkyl ethercarboxylic acid salts. These carboxylic acid salt-type surfactants may preferably be incorporated in a proportion of 0.5–2.5 g/l in an aqueous dispersion medium at the time of emulsion polymerization for the rubber trunk polymer.

As the ethylenically unsaturated monomer graft-polymerized onto the rubber trunk polymer, a known monomer may be used. Examples thereof may include: alkyl acrylate, alkyl methacrylates, acrylic acid, methacrylic acid, (meth)acrylamide, vinyl acetate, unsaturated nitriles, aromatic vinyls, conjugated dienes, alkyl vinyl ethers, alkyl vinyl ketones, 2-hydroxyethyl (meth)acrylate, (alkoxy) polyethylene glycol (meth)acrylate, diacetoneacrylamide, vinyl chloride, vinylidene chloride, itaconic acid, alkyl itaconates, and isobutene, and at least one species of these monomers may be used. During the graft polymerization, additional aqueous dispersion medium and surfactant may be added as desired. The influence of the surfactant additionally used at this time on the acid precipitation is not so serious as the surfactant used in the emulsion polymerization for the rubber trunk polymer, but the use of a carboxylic acid-type surfactant is still preferred.

As for the ratio between the rubber trunk polymer and the branch polymer in the graft copolymer, the former may be used in 5–95 wt. %, preferably 8–80 wt. %, and the latter may be used in 5–95 wt. %, preferably 20–92 wt. %. If the rubber trunk polymer is less than 5 wt. %, it becomes difficult to impart the antistatic property, and in excess of 95 wt. %, the rigidity is lost in the case of using the graft copolymer alone nor it is difficult to impart mutual solubility in the case of using a mixture with a thermoplastic resin.

Into the latex of the graft copolymer obtained in the above-described manner, an aqueous solution of a strong acid, preferably hydrochloric acid, is added, thereby precipitating the graft copolymer (a), which is then recovered as solid powder. The latex of the graft copolymer (a) stabilized with the carboxylic acid-type surfactant as described loses its stability as a result of rapid neutralization of the system by the addition under stirring of the strong acid aqueous solution, to be recovered as strongly aggregated solid powder having a low moisture content. For example, effective acid precipitation can be realized by 100–500 wt. parts of hydrochloric acid aqueous solution at a relatively low, concentration of 0.1–2 wt. % to 100 wt. parts of the latex of the graft copolymer (a) at a solid matter concentration of 20–40 wt. %, and the product can be effectively dried by a drier adapted to mass production, such as an airborne-type instantaneous drier or a fluidized bed-type drier to be recovered as a solid powdery form of graft copolymer (a).

The antistatic resin composition of the present invention is obtained by adding, to 7–100 wt. parts of the thus-obtained graft copolymer (a), 0–93 wt. parts of a thermoplastic resin (b) and 0.1–5 wt. parts per 100 wt. parts in total of the above (a) and (b) of an anionic surfactant (c) having a thermal weight loss initiation temperature of at least 250° C.

Examples of the thermoplastic resin (b) used together with the graft copolymer may include: polyethylene, polypropylene, polyvinyl chloride, polyvinylidene chloride, aromatic vinyl polymers, nitrile resins, polymethyl methacrylate and copolymers thereof, ABS resin, acrylonitrile-styrene resin, polycarbonate resin, polyamide resin, polyester resins, and fluorine-containing resins, among which a resin having a good compatibility with the graft copolymer is used, and thermoplastic resins other than the above can also be used.

The thermoplastic resin (b) may be used, as desired, in addition to the graft copolymer (a), in consideration of the processability, strength, etc., of the antistatic resin composition of the present invention depending on the usage thereof, and can be omitted. In the case of using a mixture of the graft copolymer (a) and the thermoplastic resin (b), the rubber trunk polymer in the graft copolymer (a) is caused to be present in an amount of 5–80 wt. parts, preferably 10–60 wt. parts, per 100 wt. parts in total of the (a) and (b), in order to ensure a necessary antistatic property.

The anionic surfactant (c) is used so as to be adsorbed onto the alkylene oxide group of the rubber trunk polymer in the graft copolymer (a) to impart a permanent antistatic property, and one having a thermal weight loss initiation temperature according to JIS-K7120 (hereinafter sometimes denoted by "Tng") of at least 250° C. The thermal weight loss initiation temperature has been recognized to have some degree of correlation with the structure of an anionic surfactant, and examples of the anionic surfactant having a thermal weight loss initiation temperature of at least 250° C. may include: alkylbenzenesulfonic acid salts, alkylnaphthalene-sulfonic acid salts, aliphatic acid salts, perfloroalkylsulfonic acid salts, trifluoromethane-sulfonic acid salts, and perfluoroalkylcarboxylic acid salts. It has been also found that such an anionic surfactant is combined with the graft copolymer (a) having an alkylene oxide group in its rubber trunk polymer of the present invention to exhibit good permanent antistatic property without causing bleed-out to the surface of a shaped body.

As mentioned above, an antistatic resin composition obtained by using an anionic surfactant having a thermal weight loss initiation temperature of below 250° C. is liable to cause haze or discoloration of the shaped body and a lowering in antistatic property due to a decrease of the anionic surfactant, presumably because of decomposition, scattering, etc., of the anionic surfactant during the shaping and processing in the case of severer shaping and processing conditions for complying with mass production, etc.

Incidentally, examples of such anionic surfactants having a thermal weight loss initiation temperature of below 250° C. include: alkylsulfuric acid ester salts, succinic acid ester sulfonic acid salts, phosphoric acid ester salts, polyoxyethylene alkyl ethersulfuric acid ester salts and polyoxyethylene alkyl phenol ethersulfonic acid salts.

The selection of metal species constituting an anionic surfactant also has a relation with the effect of the anionic surfactant also has a relation with the effect of the anionic surfactant as an antistatic agent, and for the purpose of the present invention, a salt of an alkaline metal having an atomic number of 19 (corresponding to potassium) is preferred because of a large ionic diameter thereof suitable for providing a necessary antistatic property at a relatively small amount of addition, and also in view of a shorter time for blending with the graft copolymer (a) and the thermoplastic resin (b) and better physical properties of the shaped product, particularly resistance to whitening with warm water.

The anionic surfactant (c) is used in a proportion of 0.1–5 wt. parts per 100 wt. parts in total of the graft copolymer (a) and the thermoplastic resin (b). Below 0.1 wt. part, the antistatic property-improving effect is scarce, and in excess of 5 wt. parts, the blending-out to the surface of a shaped product becomes remarkable to provide undesirable properties of the shaped product.

The antistatic resin composition of the present invention can further contain additives, as desired, such as an ultra-violet absorber, a thermal stabilizer, an antioxidant, a lubricant, a filter and dyes or pigments, in addition to the above-mentioned components (a)–(c), and the addition of these can be effected at any time of polymerization, blending, shaping, etc.

The antistatic resin composition of the present invention can be dispersed in an organic solvent to form a dispersion liquid of an application type or a film-forming type. Preferred examples of the organic solvent may include: aromatic hydrocarbons, such as benzene, toluene and xylene; chlorine-containing compounds, such as dichloromethane and chloroform; ethers, such as dioxane and tetrahydrofuran; ketones, such as acetone and methyl ethyl ketone; esters such as ethyl acetate and butyl acetate; and nitrogen-containing compounds, such as dimethylformamide and N-methylpyrrolidone. Further, a mixture of two or more species of solvents can also be used.

The concentration of the dispersion liquid is not particularly restricted but may preferably be on the order of 5–60 wt. %, more preferably 5–30 wt. %.

The antistatic resin composition of the present invention can be formed into arbitrary shaped products, such as sheets, films, pipes, profile shapes, and two-color-parts, through ordinary molding: processes, such as injection molding, extrusion, compression molding and vacuum forming.

Specific examples of application thereof may include: electrical articles and parts (for semiconductor production, for electrophotography, for electronic parts, for picture display devices, for electronic game devices, for transportation of articles), packaging materials (for medical inspection, for jewelry decoration), acoustic and data recording materials (for magnetic recording for optical recording), building materials (transporting pipes, clean room panels), and illumination articles (illumination cover, automatic vendor panels, automobile panels), for which plastics are used and antistatic property is necessary or desirable.

EXAMPLES

Hereinbelow, the present invention will be described more specifically based on Examples. Incidentally, "part(s)" used in Examples means "part(s) by weight" and physical properties described were measured according to methods described representatively below.

(i) Thermal Weight Loss Initiation Temperature (Tng)

According to JIS-K7120, 8 mg of a sample dried in advance at 80° C. was heated at a temperature increasing rate of 10° C./min in a nitrogen atmosphere, and the measurement was performed by using a thermobalance ("TG50", made by Mettler Instrumente A.G.).

(ii) Volume Intrinsic Resistivity or Surface Intrinsic Resistivity

According to JIS K-6911, a sample was subjected to 3 days of conditioning at temperature: 23° C. and humidity: 23%RH and subjected to measurement by an ultra-super insulation meter ("SM-10E", made by Toa Dempa Kogyo K.K.).

The antistatic property of a shaped property may be correlated with a volume intrinsic resistivity; (ohm.cm) of a material. Herein, a volume intrinsic resistivity of at most $10^{12}$ is judged to be an excellent antistatic property; above $10^{12}$ and below $10^{13}$, inferior antistatic properties; and above $10^{13}$, no antistatic property. The antistatic property of a coating film may be correlated with a surface intrinsic resistivity (ohm). Herein a surface intrinsic resistivity of at most $10^{12}$ is judged to be an excellent antistatic property.

(iii) Transparency

According to JIS K-7015, a sample was subjected to 1 day of conditioning at temperature: 23° C. and humidity: 23%RH and then subjected to measurement by a haze meter ("TC-H3DP, made by Tokyo, Denshoku K.K.).

(Graft Copolymer 1)

Into a pressure-resistant reaction vessel equipped with a stirrer, a thermometer and a pressure gauge, (a) a rubber trunk polymer-forming composition:

| | |
|---|---|
| 1,3-Butadiene (i) | 23 part(s) |
| Butyl acrylate (i) | " " |
| Methoxypolyethylene glycol methacrylate (ii) (having averagely ca. 23 ethylene oxide groups) | 12 " |
| Diisopropylbenzene hydroperoxide | 0.016 " |
| Formaldehyde sodium sulfoxylate | 0.006 " |
| Iron (III) ethylenediamine-tetraacetate | 0.0015 " |
| Sodium pyrophosphate | 0.2 " |
| Potassium oleate | 2.0 " |
| Deionized water | 200 " | was charged and stirred at 60° C. for 10 hours. Latex of a rubber trunk polymer having an average particle size of 80 nm was obtained at a yield of 99%.

(b) To the above latex of rubber trunk polymer (65 parts as solid matter), a mixture of ethylenically unsaturated monomer (iv):

| | |
|---|---|
| Methyl methacrylate | 35 part(s) |
| Normal-octyl mercaptan | 0.3 " |
| Diisopropylbenzene hydroperoxide | 0.018 " |
| Formaldehyde sodium sulfoxylate | 0.007 " |
| Potassium oleate | 1.0 " |
| Deionized water | 50 " | was added, and the mixture was aerated with nitrogen and subjected to graft copolymerization at 60° C. for 10 hours. The latex was taken out, and 200 parts of hydrochloric acid aqueous solution (concentration: 0.7 wt. %) was added to cause precipitation. After dewatering and washing, a wet powder state graft copolymer having a moisture content of 43 wt. % was obtained. The product was dried at a hot air temperature of 100° C. by an airborne instantaneous drier to obtain Graft copolymer 1 in white powder form at a yield of 97%.

(Graft Copolymer 2)

Graft-polymerization was performed in the same manner as the above-mentioned process for Graft copolymer 1 except for changing the 1,3-butadiene to 27 parts and the methoxypolyethylene glycol to 8 parts in the rubber trunk polymer-forming composition (a) and the 1.0 part of potassium oleate to 0.5 part of sodium dodecylbenzenesulfonate in the ethylenically unsaturated monomer mixture (b), followed by precipitation, dewatering and washing in the same manner as Graft copolymer 1 to obtain a wet powder-state graft copolymer having a moisture content of 70 wt. %. The precipitate was dried in the same manner as in the case of Graft copolymer 1 to obtain Graft copolymer 2.

(Graft Copolymer 3)

Graft copolymer 3 was prepared in the same manner as Graft copolymer 1 except for changing the 1,3-butadiene to 29 parts and the methoxypolyethylene glycol methacrylate to 6 parts in the composition (a).

(Graft Copolymer 4 (Comparative))

Graft copolymer 4 was prepared in the same manner as Graft copolymer 2 except for changing, the 1,3-butadiene to 32 parts and the methoxypolyethylene glycol methacrylate to 3 parts in the composition (a).

(Graft Copolymer 5 (Comparative))

Graft copolymer 5 was prepared in the same manner as the process for Graft copolymer 2 except for changing the potassium oleate to 1.0 part of sodium dodecylbenzenesulfonate in the composition (a).

To the resultant graft copolymer latex, 200 parts of calcium chloride aqueous solution (concentration: 2 wt. %) was added instead of the hydrochloric acid aqueous solution to precipitate the copolymer. After dewatering and washing, a wet powder-state graft copolymer having a moisture content of 150 wt. % was obtained.

As it was impossible to dry such a high moisture content of graft copolymer in the same manner as Graft copolymer 1, the wet graft copolymer was dried for 3 days in a tray drier at an internal temperature of 60° C. to obtain Graft copolymer 5 in white powder form at a yield of 97%.

Example 1

With 50 parts of Graft copolymer 1 (containing 32.5 parts of rubber trunk polymer), 50 parts of methacrylic resin ("Sumipex B-MHG", made by Sumitomo Kagaku K.K.) and 1.0 part of potassium dodecylbenzenesulfonate (antistatic agent) having a thermal weight loss initiation temperature (Tng) of 430° C. were blended by means of a Henschel mixer. Then, the resultant powder was formed into pellets through a parallel twin-screw extruder having a cylinder diameter of 20 mm ("Laboplastmill", made by Toyo Seiki K.K.).

The pellets were molded by an injection molding machine ("IS-80EPN", made by Toshiba Kikai K.K.) equipped with a flat sheet mold (100 L×50 W×3t (mm)) under the conditions of a cylinder temperature=220° C., a mold temperature=40° C., and residence time in the cylinder of 40 sec. and 600 sec., respectively. The thus-molded two types of flat sheets were respectively subjected to measurement of volume intrinsic resistivity and transparency, whereby each sheet exhibited a volume intrinsic resistivity of $2 \times 10^{11}$ ohm.cm, a whole-light transmittance of 91% and a haze of 3%, thus exhibiting an excellent antistatic property without causing a lowering of antistatic property due to thermal degradation.

Example 2

A resin composition was prepared and evaluated in the same manner as in Example 1 except that the anionic surfactant as an antistatic agent was changed to potassium nonafluorobutanesulfonate (Tng=460° C.). The molded two types of flat sheets each exhibited a volume intrinsic resistivity of $1 \times 10^{11}$ ohm.cm, a whole-light transmittance of 91% and a haze of 3%, thus exhibiting an excellent antistatic property without causing a lowering of antistatic property due to thermal degradation.

Comparative Example 1

A resin composition was prepared and evaluated in the same manner as in Example 1 except, that the anionic surfactant as an antistatic agent was changed to sodium dioctylsulfosuccinate (Tng=240° C.). The flat sheet molded at a cylinder residence time of 40 sec. exhibited a volume intrinsic resistivity of $3\times10^{11}$ ohm.cm, a whole-light transmittance of 91% and a haze of 3%, thus exhibiting an excellent antistatic property, but the flat sheet molded at a cylinder residence time of 600 sec. exhibited a volume intrinsic resistivity of $4\times10^{12}$ ohm.cm, a whole-light transmittance of 80% and a haze of 12%, thus having resulted in lower transparency and antistatic property due to thermal degradation.

Comparative Example 2

A resin composition was prepared and evaluated in the same manner as in Example 1 except that the anionic surfactant as an antistatic agent was changed to sodium dodecylsulfate (Tng=210° C.). The flat sheet molded at a cylinder residence time of 40 sec. exhibited a volume intrinsic resistivity of $4\times10^{13}$ ohm.cm, a whole-light transmittance of 90% and a haze of 5%, thus showing an inferior antistatic property, and the flat sheet molded at a cylinder residence time of 600 sec. exhibited a volume intrinsic resistivity of $7\times10^{14}$ ohm.cm, a whole-light transmittance of 78% and a haze of 15%, thus having resulted in lower transparency and antistatic property due to thermal degradation.

The evaluation results of the above Examples 1–2 and Comparative Examples 1–2 are inclusively shown in the following Table 1.

TABLE 1

| Example | 1 | 2 | Comp. 1 | Comp. 2 |
|---|---|---|---|---|
| Graft copolymer 50 parts | 1 | 1 | 1 | 1 |
| Thermoplastic resin*1 50 parts | SBM | SBM | SBM | SBM |
| Anionic surfactant*2 1.0 part | PDBS | PNFBS | SDOSS | SDS |
| <Cylinder residence time = 40 sec> | | | | |
| $R_{V1}$*3 ohm.cm | $2\times10^{11}$ | $1\times10^{11}$ | $3\times10^{11}$ | $4\times10^{13}$ |
| $T_{WL}$*4 % | 91 | 91 | 91 | 90 |
| Haze % | 3 | 3 | 3 | 5 |
| <Cylinder residence time = 600 sec> | | | | |
| $R_{V1}$*3 ohm.cm | $2\times10^{11}$ | $1\times10^{11}$ | $4\times10^{12}$ | $7\times10^{14}$ |
| $T_{WL}$*4 % | 90 | 91 | 80 | 78 |
| Haze % | 3 | 3 | 12 | 15 |

Notes to Table 1
*1 SBM = Sumipex B-MHG
*2 PDBS = potassium dodecylbenzenesulfonate
PNFBS = potassium nonefluorobutanesulfonate
SDOSS = sodium dioctylsulfosuccinate
SDS = sodium dodecylsulfate
*3 $R_{V1}$ = volume intrinsic resistivity
$T_{WL}$ = whole-light transmittance Example 3

A resin composition was prepared and evaluated in the same manner as in Example 1 except for using Graft copolymer 2 instead of Graft copolymer 1. The molded two types of flat sheets each exhibited a volume intrinsic resistivity of $4\times10^{11}$ ohm.cm, a whole-light transmittance of 91% and a haze of 3%, thus exhibiting an excellent antistatic property without causing a lowering of antistatic property due to thermal degradation.

Example 4

A resin composition was prepared and evaluated in the same manner as in Example 1 except for using Graft copolymer 3 instead of Graft copolymer 1. The molded two types of flat sheets each exhibited a volume intrinsic resistivity of $8\times10^{11}$ ohm.cm, a whole-light transmittance of 91% and a haze of 3%, thus exhibiting an excellent antistatic property without causing a lowering of antistatic property due to thermal degradation.

Comparative Example 3

A resin composition was prepared and evaluated in the same manner as in Example 1 except for using Graft copolymer 4 instead of Graft copolymer 1. The molded two types of flat sheets each exhibited a volume intrinsic resistivity of $1\times10^{13}$ ohm.cm, a whole-light transmittance of 91% and a haze of 3%, thus exhibiting an inferior antistatic property.

Comparative Example 4

A resin composition was prepared and evaluated in the same manner as in Example 1 except for using Graft copolymer 5 instead of Graft copolymer 1. The flat sheet molded at a cylinder residence time of 40 sec. exhibited a volume intrinsic resistivity of $5\times10^{12}$ ohm.cm, a whole-light transmittance of 87% and a haze of 6%, and the flat sheet molded at a cylinder residence time of 600 sec. exhibited a volume intrinsic resistivity of $7\times10^{12}$ ohm.cm, a whole-light transmittance of 85% and a haze of 8%.

It is understood that the sodium dodecylbenzenesulfonate used as a polymerization emulsifier remained in the form of calcium dodecylbenzenesulfonate to obstruct the adsorption of potassium dodecylbenzenesulfonate, thereby resulting in inferior transparency and antistatic property.

The evaluation results of the above Examples 3–4 and Comparative Examples 3–4 are inclusively shown in the following Table 2.

TABLE 2

| Example | 3 | 4 | Comp. 3 | Comp. 4 |
|---|---|---|---|---|
| Graft copolymer 50 parts | 2 | 3 | 4 | 5 |
| Thermoplastic resin*1 50 parts | SBM | SBM | SBM | SBM |
| Anionic surfactant*2 1.0 part | PDBS | PDBS | PDBS | PDBS |
| <Cylinder residence time = 40 sec> | | | | |
| $R_{V1}$*3 ohm.cm | $4\times10^{11}$ | $8\times10^{11}$ | $1\times10^{13}$ | $5\times10^{12}$ |
| $T_{WL}$*4 % | 91 | 91 | 91 | 87 |
| Haze % | 3 | 3 | 3 | 6 |
| <Cylinder residence time = 600 sec> | | | | |
| $R_{V1}$*3 ohm.cm | $4\times10^{11}$ | $8\times10^{11}$ | $1\times10^{13}$ | $5\times10^{12}$ |
| $T_{WL}$*4 % | 90 | 91 | 91 | 85 |
| Haze % | 3 | 3 | 3 | 8 |

*1 to *4: Notes to Table 2 are same as the notes to Table 1.

Example 5

A resin composition was prepared and evaluated in the same manner as in Example 1 except that the anionic surfactant was changed to lithium dodecylbenzenesulfonate (Tng=435° C.). The molded two types of flat sheets each exhibited a volume intrinsic resistivity of $7\times10^{11}$ ohm.cm, a whole-light transmittance of 88% and a haze of 5%, thus exhibiting an excellent antistatic property without causing a lowering of antistatic property due to thermal degradation.

Example 6

A resin composition was prepared and evaluated in the same manner as in Example 1 except that the anionic surfactant as an antistatic agent was changed to sodium dodecylbenzenesulfonate (Tng=430° C.). The molded two types of flat sheets each exhibited a volume intrinsic resistivity of $4 \times 10^{11}$ ohm.cm, a whole-light transmittance of 88% and a haze of 5%, thus exhibiting an excellent antistatic property without causing a lowering of antistatic property due to thermal degradation.

Example 7

A resin composition was prepared and evaluated in the same manner as in Example 1 except: that the anionic surfactant was changed to rubidrium dodecylbenzenesulfonate (Tng=430° C.). The molded two types of flat sheets each exhibited a volume intrinsic resistivity of $1 \times 10^{11}$ ohm.cm, a whole-liqht transmittance of 91% and a haze of 3%, thus exhibiting an excellent antistatic property without causing a lowering of antistatic property due to thermal degradation.

Example 8

A resin composition was prepared and evaluated in the same manner as in Example 1 except that the anionic surfactant was changed to cesium dodecylbenzenesulfonate (Tng=425° C.). The molded two types of flat sheets each exhibited a volume intrinsic resistivity of $1 \times 10^{11}$ ohm.cm, a whole-light transmittance of 91% and a haze of 3%, thus exhibiting an excellent antistatic property without causing a lowering of antistatic property due to thermal degradation.

The results of the above Examples 5–8 are inclusively shown in the following Table 3.

TABLE 3

| Example | 5 | 6 | 7 | 8 |
|---|---|---|---|---|
| Graft copolymer 50 parts | 1 | 1 | 1 | 1 |
| Thermoplastic resin[*1] 50 parts | SBM | SBM | SBM | SBM |
| Anionic surfactant[*2] 1.0 part | LDBS | SDBS | RDBS | CDBS |
| <Cylinder residence time = 40 sec> | | | | |
| $R_{V1}$[*3] ohm.cm | $7 \times 10^{11}$ | $4 \times 10^{11}$ | $1 \times 10^{11}$ | $1 \times 10^{11}$ |
| $T_{WL}$[*4] % | 88 | 88 | 91 | 90 |
| Haze % | 5 | 5 | 3 | 3 |
| <Cylinder residence time = 600 sec> | | | | |
| $R_{V1}$[*3] ohm.cm | $7 \times 10^{11}$ | $4 \times 10^{11}$ | $1 \times 10^{11}$ | $1 \times 10^{11}$ |
| $T_{WL}$[*4] % | 88 | 88 | 91 | 91 |
| Haze % | 5 | 5 | 3 | 3 |

Notes to Table 3
[*1], [*3] and [*4]: Same as in TABLE 1
[*2] LDBS = lithium dodecylbenzenesulfonate
SDBS = sodium dodecylbenzenesulfonate
RDBS = rubidium dodecylbenzenesulfonate
CDBS = cesium dodecylbenzenesulfonate

Example 9

To 100 parts of powder of Graft copolymer 1, 1.5 parts of potassium dodecylbenzenesulfonate having a thermal weight loss initiation temperature of 430° C. was added, and the mixture was dispersed in 400 parts of methyl ethyl ketone (organic solvent). Then, the liquid was applied onto a PVC (polyvinyl chloride) sheet (made by Mitsubishi Jushi K.K., thickness=250 μm), followed by removal of the solvent, to form a 20 μm-thick coating film. As a result of the surface intrinsic resistivity measurement, the coating film on the PVC sheet exhibited a surface intrinsic resistivity of $8 \times 10^{11}$ ohm, thus showing an excellent antistatic property.

Example 10

A 15 μm-thick coating film was formed in a similar manner as in Example 9 except for using methyl acetate as the organic solvent. As a result of the surface intrinsic resistivity measurement in the same manner as in Example 9, the coating film on the PVC sheet exhibited a surface intrinsic resistivity of $9 \times 10^{11}$ ohm, thus showing an excellent antistatic property.

Example 11

A coating film was formed in the same manner as in Example 9 except for changing the anionic surfactant as the antistatic agent to 1.5 parts of potassium nonafluorobutanesulfonate and the organic solvent to toluene. As a result of the surface intrinsic resistivity measurement in the same manner as in Example 9, the coating film on the PVC sheet exhibited a surface intrinsic resistivity of $8 \times 10^{11}$ ohm, thus showing an excellent antistatic property.

Comparative Example 5

A coating film was formed in the same manner as in Example 9 except for omitting the anionic surfactant as the antistatic agent. As a result of the surface intrinsic resistivity measurement in the same manner as in Example 9, the coating film on the PVC sheet exhibited a surface intrinsic resistivity of $2 \times 10^{15}$ ohm, thus showing an inferior antistatic property.

Comparative Example 6

A coating film was formed in the same manner as in Example 9 except for using Graft copolymer 4 instead of Graft copolymer 1. As a result of the surface intrinsic resistivity measurement in the same manner as in Example 9, the coating film on the PVC sheet exhibited a surface intrinsic resistivity of $4 \times 10^{14}$ ohm, thus showing an inferior antistatic property.

Example 12

A 15 μm-thick coating film was formed in a similar manner as in Example 9 except for using a PET (polyethylene terephthalate) sheet (made by Toyo Boseki K.K., thickness=100 μm) instead of the PVC sheet. As a result of the surface intrinsic resistivity measurement in the same manner as in Example 9, the coating film on the PET sheet exhibited a surface intrinsic resistivity of $9 \times 10^{11}$ ohm, thus showing an excellent antistatic property.

Example 13

A coating film was formed in the same manner as in Example 9 except for using a PC (polycarbonate) sheet (thickness 500 μm) instead of the PVC sheet. As a result of the surface intrinsic resistivity measurement in the same manner as in Example 9, the coating film on the PC sheet exhibited a surface intrinsic resistivity of $9 \times 10^{1}$ ohm, thus showing an excellent antistatic property.

Example 14

A coating film was formed in a similar manner as in Example 9 except for using a PS (polystyrene) sheet (thickness=500 μm) instead of the PVC sheet. As a result of the surface intrinsic resistivity measurement in the same manner as in Example 9, the coating film on the PS sheet exhibited a surface intrinsic resistivity of $9 \times 10^{11}$ ohm, thus showing an excellent antistatic property.

The results of Examples 9–14 and Comparative Examples 5–6 are inclusively shown in the following Table 4 and Table 5.

TABLE 4

| Example | 9 | 10 | 11 | Comp. 5 | Comp. 6 |
|---|---|---|---|---|---|
| Graft copolymer | 1 | 1 | 1 | 1 | 4 |
| Anionic surfactant *2 | PDBS | PDBS | PNFBS | none | PDBS |
| Organic solvent*5 | MEK | MA | toluene | MEK | MEK |
| Thickness (μm) | 20 | 15 | 20 | 20 | 20 |
| Base sheet material | PVC | PVC | PVC | PVC | PVC |
| Surface intrinsic resistivity (ohm) | $8 \times 10^{11}$ | $9 \times 10^{11}$ | $8 \times 10^{11}$ | $2 \times 10^{15}$ | $4 \times 10^{14}$ |

*2: Same as in Table 1
*5MEK = methyl ethyl ketone
MA = methyl acetate

TABLE 5

| Example | 12 | 13 | 14 |
|---|---|---|---|
| Graft copolymer | 1 | 1 | 1 |
| Anionic surfactant *2 | PDBS | PDBS | PDBS |
| Organic solvent*5 | MEK | MEK | MEK |
| Thickness (μm) | 20 | 20 | 20 |
| Base sheet material | PET | PC | PS |
| Surface intrinsic resistivity (ohm) | $9 \times 10^{11}$ | $9 \times 10^{11}$ | $9 \times 10^{11}$ |

*2, *5: Same as in Table 4

INDUSTRIAL APPLICABILITY

According to the present invention, by admixing a specific anionic surfactant to a thermoplastic resin including a graft copolymer formed from a rubber trunk polymer having an alkylene oxide group and obtained by polymerization in the presence of a specific emulsifier, it is possible to obtain an antistatic resin composition which can be effectively produced on an industrial scale and can provide a shaped product free from haze or discoloration, good in transparency and further excellent in antistatic property, even when processed under severe processing conditions.

What is claimed is:

1. An antistatic resin composition, comprising: (a) 7–100 wt. parts of a graft copolymer formed by graft-polymerizing an ethylenically unsaturated monomer onto a rubber trunk polymer having an alkylene oxide group via an ester bond which rubber trunk polymer has been obtained by using a carboxylic acid salt surfactant as an emulsifier for polymerization, said graft copolymer having been recovered by acid precipitation, (b) 0–93 wt. parts of a thermoplastic resin, and (c) 0.1–5 wt. parts of an anionic surfactant having a thermal weight loss initiation temperature (as defined by JIS K7120) of at least 250° C.; wherein the rubber trunk polymer occupies 5–80 wt. parts within 100 wt. parts in total of (a) and (b).

2. An antistatic resin composition according to claim 1, wherein the anionic surfactant (c) comprises at least one species selected from the group consisting of alkylbenzenesulfonic acid salts, alkylnaphthalenesulfonic acid salts, perfluoroalkylsulfonic acid salts, trifluoromethanesulfonic acid salts, perfluoroalkylcarboxylic acid salts and aliphatic acid salts.

3. An antistatic resin composition according to claim 1, wherein and anionic surfactant (c) is a salt of an alkaline metal having an atomic number of 19 (corresponding to potassium) or larger.

4. An antistatic resin composition according to claim 1, wherein the graft copolymer (a) is a graft copolymer formed by graft-copolymerizing (iv) 5–95 wt. parts (giving a total of 100 wt. parts with the rubber trunk polymer) of the ethylenically unsaturated monomer onto 5–95 wt. parts of the rubber trunk polymer comprising (i) 50–90 wt. % of at least one monomer selected from conjugated dienes and acrylate esters, (ii) 5–50 wt. % of at least one monomer having 4–500 alkylene oxide groups and an ethylenically unsaturated bond, and (iii) 0–40 wt. % of at least one ethylenically unsaturated monomer copolymerizable with the conjugated dienes and acrylate esters.

5. An antistatic resin composition according to claim 1, wherein the carboxylic acid salt surfactant is selected from the group consisting of aliphatic acid salts, rosin acid salts, N-acylamino acid salts and alkyl ether carboxylic acid salts.

6. A dispersion liquid obtained by dispersing an antistatic resin composition according to claim 1 in an organic solvent.

7. A dispersion liquid obtained by dispersing an antistatic resin composition according to claim 2 in an organic solvent.

8. A dispersion liquid obtained by dispersing an antistatic resin composition according to claim 3 in an organic solvent.

9. A dispersion liquid obtained by dispersing an antistatic resin composition according to claim 4 in an organic solvent.

10. A dispersion liquid obtained by dispersing an antistatic resin composition according to claim 5 in an organic solvent.

* * * * *